Sept. 20, 1960     T. F. BENEWICZ     2,953,746
PEAK READING VOLTMETER FOR INDIVIDUAL PULSES
Filed Dec. 18, 1958     2 Sheets-Sheet 1

INVENTOR
T. F. BENEWICZ
BY J. P. Kearns
ATTORNEY

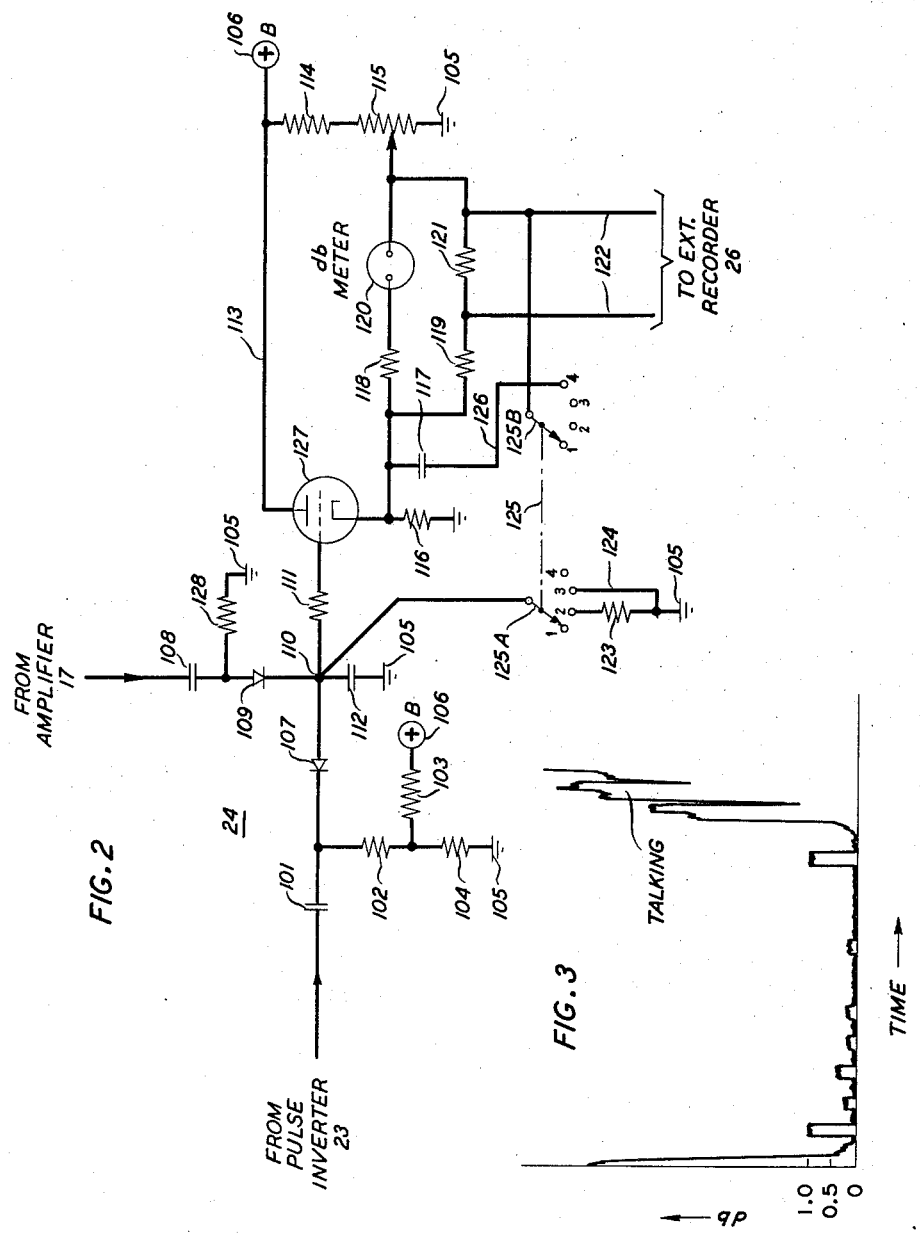

United States Patent Office 2,953,746
Patented Sept. 20, 1960

1

2,953,746

PEAK READING VOLTMETER FOR INDIVIDUAL PULSES

Thomas F. Benewicz, Fort Lee, N.J., assignor to Bell Telephone Laboratories, Incorporated, New York, N.Y., a corporation of New York Filed Dec. 18, 1958, Ser. No. 781,399

1 Claim. (Cl. 324—103)

This invention relates generally to measuring instruments and specifically to peak-reading electronic voltmeters.

Heretofore, peak-reading voltmeters employing a triode electron tube driving a direct-current meter and having a rectifier-charged capacitor in its grid circuit are suited to obtaining an accurate indication of the peak amplitude of a single pulse or of the average peak amplitude of a train of pulses of fluctuating amplitudes. In the latter case the actual indication is dependent on the frequency of the pulse train and on the time constants of the charge and leakage paths associated with the capacitor. The result is that the instantaneous indication on the meter is either too high or too low depending on whether the incident pulse was preceded by a pulse of higher or lower peak amplitude.

It is an object of this invention to improve existing peak-reading electronic voltmeters by making the instantaneous meter reading independent of the prior charged state of the grid capacitor.

It is another object of the invention to increase the accuracy of measurement of amplitude level changes from one pulse of a series to the next.

According to this invention an auxiliary circuit for an electronic peak-reading voltmeter is arranged to clear out any residual charge on the grid capacitor immediately upon the incidence of a new pulse to be measured. This is accomplished by deriving a voltage spike of proper polarity from the leading edge of each pulse incident on the measuring circuit and by applying this derived spike to the grid capacitor. The grid capacitor is immediately discharged to a reference value and is then free to be recharged by the simultaneous direct application of the pulse to be measured.

The electron peak-reading voltmeter according to this invention has been found to be particularly useful in a transmission level measuring system for telephotographic networks as disclosed in copending joint application of mine and A. E. Ruppel, Serial No. 781,359, filed of even date with this application. Accordingly, the invention is hereinafter described in detail in terms of an embodiment directed to transmission measurement in a telephotographic system.

A feature of the invention is an increase in the accuracy of detection of peak amplitude changes between successive pulses of a train of the order of 0.25 decibel.

The above and further objects and advantages of the improved voltmeter of this invention will be appreciated from a consideration of the following description and the drawings, in which:

Fig. 2 is a circuit diagram of the improved electronic voltmeter according to this invention; and Fig. 3 is a strip chart graph obtained from the voltmeter circuit of this invention.

2

Figure 1:
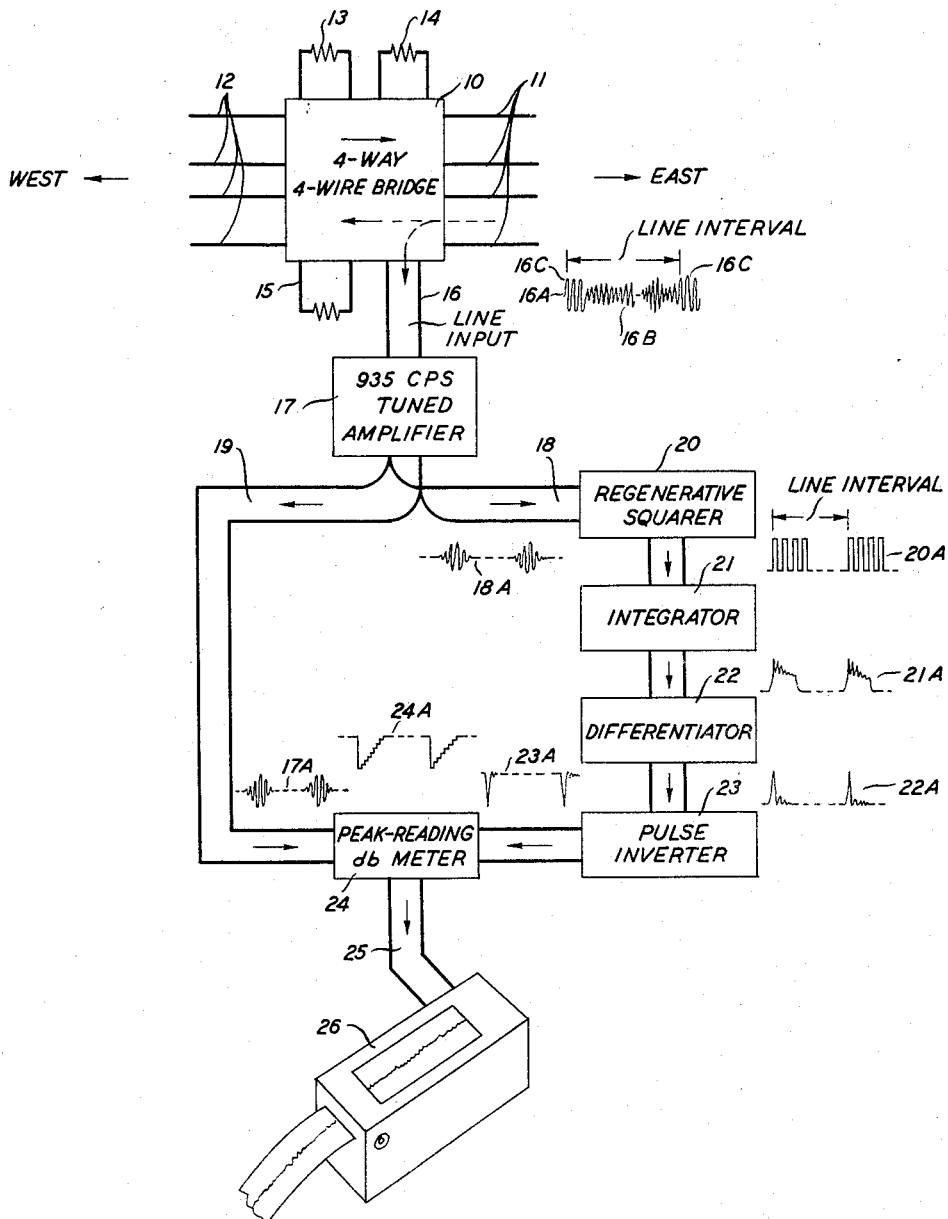
Fig. 1 is a block diagram of an embodiment of a peak-reading electronic voltmeter incorporating the principles of this invention as applied to a telephotograph transmission level measuring system.

Fig. 1 shows a peak voltage measuring system according to this invention applied to a telephotograph transmission line interconnecting an east terminal over lines 11 and a west terminal over lines 12. In order to tap off a signal to be measured without interfering with through transmission of the telephotograph signal a four-way four-wire bridge 10 of conventional construction is provided at a point in the transmission line where it is desired to measure transmission level. Resistors 13, 14 and 15 are provided for the termination of unused bridge legs. Bridge 10 may be located, as is well known, at any intermediate point in the transmission line as well as at a terminal point.

The complete telephotograph system in which the bridge may be located is disclosed in the aforementioned copending application.

The line signal which it is desired to monitor is that incoming from the east on the lower pair of line 11, and comprises a composite picture and burst signal as shown in waveform 16A. The signal represented by waveform 16A results from the scanning of a photograph or line drawing at the sending station line by line. A single line of approximately 850 milliseconds' duration is represented by waveform 16A and comprises a picture information portion 16B of varying amplitude in the frequency range of 1200 to 2600 cycles per second and a tone burst portion 16C at a frequency of approximately 935 cycles per second and of approximately 25 milliseconds' duration. Tone burst portion 16C is assumed to have been transmitted from the sending station at a known reference lever. It is the level of the latter portion of the composite signal that it is desired to measure at the measuring station after transmission over an arbitrary length of transmission line.

The composite incoming signal as indicated by waveform 16A is picked off the transmission line 11 by bridge 10 and applied to test line 16. The burst signal is first separated from the picture signal by tuned amplifier 17. Amplifier 17 may include a narrow bandpass filter of any well-known type centered at 935 cycles per second, the frequency of the burst signal. The gain of the amplifier is preset to give a voltmeter reading of zero decibels below one milliwatt when transmission levels are normal.

It will be understood that amplifier 17 is not essential to this invention and is included merely to show the utility of this invention in a particular practical measuring system. Direct-current pulse trains, for example, may be measured using an untuned amplifier.

At the output of amplifier 17 the separated burst signal divides between the paths 18 and 19. Waveforms 17A and 18A show that the signals traversing the two paths are substantially identical, but slightly distorted compared to waveform 16A due to traversing amplifier 17. The path 19 applies wave 17A directly to the input of the peak-reading voltmeter 24 in the conventional manner. However, path 18 applies wave 18A to the voltmeter 24 by way of regenerative squarer 20, integrator 21, differentiator 22 and pulse inverter 23.

Regenerative squarer 20 regenerates each cycle of the 935-cycle clamp-bar pulse train into square-wave pulses of constant amplitude. Squarer 20 may be of any well-known construction such as, for example, a cathode-coupled multivibrator. The output of the squarer is therefore a constant-amplitude square-wave pulse train having a fundamental frequency of 935 cycles per second and a duration of 25 milliseconds as shown in waveform 20A.

The waveform 20A is next applied to integrator 21 which may be a simple parallel resistor-capacitor network. Rectification of the output of squarer 20 may be found advantageous in some instances. The output of integrator 21 appears as a broad-topped 25-millisecond pulse with a relatively steep leading edge as shown in waveform 21A.

Following integrator 21 is a differentiator 22 to which waveform 21A is applied for the purpose of producing a sharp positive spike coincident with the leading edge of the tone burst signal to be measured. Differentiator 22 may comprise a series capacitor and shunt resistor network forming the grid circuit of a triode electron tube. The output of differentiator 22 is shown generally as waveform 22A.

The positive spike output 22A of differentiator 22 is in turn applied to pulse inverter 23, which may comprise a triode tube as mentioned above. Waveform 22A applied to the grid circuit is inverted in the tube to produce in the anode circuit a sharp negative pulse such as represented by waveform 23A.

By the means just described a negative spike as shown in waveform 23A is produced which is coincident in time with the start of the tone burst pulse of waveform 17A. The width of negative spike 23A should be of the order of 10 percent or less of that of the tone burst for proper operation. Both waveforms are applied to separate inputs of electronic voltmeter 24.

Referring now to Fig. 2, a simplified circuit diagram of the essential parts of a typical peak-reading electron voltmeter modified in accordance with this invention is seen. A peak-reading electron tube voltmeter essentially comprises, as is well known, a triode electron tube having in its anode or cathode circuit a direct-current ammeter and in its grid circuit a shunt capacitor which is charged through a diode rectifier by the wave to be measured.

The circuit of Fig. 2 has these elements: triode tube 127, direct-current meter 120, capacitor 112 and diode 109. Capacitor 112 is connected between the grid of tube 127 through paraistic-suppressing resistor 111 and ground at point 105. Also connected to capacitor 112 at junction point 110 is diode 109, which may be a solid type rectifier. Diode 109 is poled for easy conduction toward junction point 110. To the anode of diode 109 by way of capacitor 108 is applied the direct output of amplifier 17. Resistor 128 connected between ground 105 and the junction of capacitor 108 and diode 109 provides a discharge path for capacitor 108 in the normal manner.

Without more the circuit of Fig. 2 operates as a conventional peak-reading voltmeter. A voltage wave from amplifier 17 is rectified by diode 109 and is applied to capacitor 112 which then tends to charge to the peak of the rectified wave. Being in the grid circuit of tube 127, which has its anode directly connected by way of line 113 to potential source 106 (not shown), the positively charged capacitor causes the tube to draw increased anode current and thereby to increase the voltage drop across cathode resistor 116. Inasmuch as microammeter 120 is connected between the cathode of tube 127 and a point of reference voltage on the voltage divider comprising resistor 114 and potentiometer 115, a reading appears on the meter which is proportional to the amplitude of the incident wave. The scale of meter 120 may conveniently be calibrated in a logarithmic decibel scale. Resistor 118 in series with meter 120 is for the purpose of limiting the voltage across the meter to a safe value. Resistors 119 and 121 shunt the meter principally to provide a means of connection to an external recorder by way of lines 122.

Selector switches 125A and 125B are operated together as indicated by dashed line 125 connecting the switch brushes. In position 1 of the switches the charging time of capacitor 112 is determined solely by the impedance of the source and the discharge time, by the leakage of the capacitor through the high back resistance of diode 109 in series with resistor 128. In this position, therefore, the capacitor charges rapidly on short pulses because of the short charging time constant. However, because of the long discharge time constant, a series of sharp pulses of varying amplitude in succession will only result in a reading on the meter representing the average peak amplitude of the pulse train.

In position 2 resistor 123 is shunted across capacitor 112 thereby reducing the discharge time constant. In this position the metering system may be used to measure steady tone.

In position 3 capacitor 112 is grounded on both terminals and no measurements are possible. This position is used for zeroing the meter by adjustment of potentiometer 115 to balance out the quiescent cathode potential of tube 127.

In position 4 capacitor 117 is shunted across meter 120 and hence capacitor 112 is in the same condition as for switch position 1. In this position the meter time constant is increased, thereby causing the meter itself to average its reading over several pulses. This produces a steadier meter reading than in position 1.

According to this invention the conventional peak-reading electron tube voltmeter just described is improved by the addition of those circuit elements shown to the left of junction point 110. These additional circuit elements comprise diode 107, similar to diode 109 but poled for easy conduction away from junction point 110; a voltage divider comprising resistors 103 and 104 connected in series between potential source 106 and ground 105; a further resistor 102 connected from the junction of resistors 103 and 104 to the cathode of diode 107; and input capacitor 101. Both diodes 107 and 109 are chosen of the highest back resistance obtainable, of the order of several thousand megohms.

The cathode of diode 107 is clamped to a fixed positive voltage determined by the voltage divider comprising resistors 103 and 104 connected from potential source 106 to ground 105 for the purpose of preventing capacitor 112 from discharging through diode 107 except when a negative pulse is applied to the cathode of diode 107.

The operation of the improved peak-reading electron tube voltmeter is as follows. It is assumed that selector switch 125 is at position 1. From tuned amplifier 17 the 935-cycle pulse train feeds directly into the voltmeter through capacitor 108 and diode 109. The positive peaks of this pulse train then charge capacitor 112. This charge is retained until the following wave train arrives. Upon receipt of the following train a sharp negative spike corresponding to the leading edge of the wave train generated in path 18 as previously described is applied through capacitor 101 to the cathode of diode 107. Diode 107 is rendered conductive and capacitor 112 rapidly discharges to a voltage only slightly above ground. Following discharge of capacitor 112 and the termination of the negative voltage spike, the capacitor rapidly recharges to the peak pulse voltage through diode 109. At the same time capacitor 112 is prevented from again discharging through diode 107 by the clamping voltage applied thereto.

Microammeter 120 follows the voltage variations at the grid of cathode-follower tube 112 and thus reads the peak level of the pulse train. This reading is retained until reception of the next pulse train when the previously described actions are repeated and the meter 120 is caused to indicate the new level.

In position 4 of the switch 125, however, the meter reading does not drop appreciably on the discharge of capacitor 112 because of the shunting of capacitor 117 across the meter. The meter in a practical embodiment indicates a change in level of the input signal of ±10 decibels in three to five telephotograph scanning lines occurring at the rate of approximately 100 lines per minute.

In position 1 of switch 125 the capacitor 117 is removed from the circuit and the meter 120 then follows ±10-decibel level changes in a single line interval at 100 lines per minute.

In position 2 of switch 125 resistor 123 is shunted across capacitor 112, thus shortening the time constant of the input circuit. At this time no inverted pulse is produced in the integrator circuit as it is assumed that a steady tone signal is being measured. This position therefore permits the voltmeter to be used to measure steady tone sources.

Position 3 is used for zeroing the meter 120 for no-signal input by adjustment of potentiometer 115 as previously mentioned.

A standard graphic recording voltmeter, such as a Varian Model G–11A, may readily be connected in the circuit across resistor 121 which shunts the decibel meter 120 as shown in Fig. 2 by means of leads 122. A typical strip chart obtained on a graphic recorder is shown in Fig. 3. This chart was obtained by applying tone bursts at known levels to the improved voltmeter of this invention. Fig. 3 shows that readily readable level changes are obtainable at 0.1 decibel and lower, a significant improvement over prior voltmeter circuits.

In a practical embodiment of the improved peak-reading electronic voltmeter the following component values are given by way of example. It is to be understood that a voltmeter circuit according to this invention is not limited to these values, however.

| | |
|---|---|
| B+ source 106 | 108 volts. |
| Capacitor 101 | 0.1 microfarad. |
| Capacitor 108 | 0.02 microfarad. |
| Capacitor 112 | 0.01 microfarad mica. |
| Capacitor 117 | 50 microfarads. |
| Diode 107 | 1N300. |
| Diode 109 | 1N300. |
| Meter 120 | 100 microamperes D.-C. full scale. |
| Resistor 102 | 200 kilohms. |
| Resistor 103 | 10 kilohms. |
| Resistor 104 | 2400 ohms. |
| Resistor 105 | 100 kilohms. |
| Resistor 111 | 1 megohm. |
| Resistor 114 | 10 kilohms. |
| Resistor 115 | 1000 ohms. |
| Resistor 116 | 100 kilohms. |
| Resistor 118 | 100 kilohms. |
| Resistor 119 | 1 megohm. |
| Resistor 121 | 1000 ohms. |
| Resistor 123 | 3.9 megohms. |
| Tube 127 | ½ Western Electric type 396A. |

It will be readily apparent to one skilled in the art that the improved peak-reading voltmeter of this invention is not restricted in its application to transmission level measurements in telephotograph systems. Any pulse train of varying amplitude may be measured on an individual pulse basis by the voltmeter of this invention. Its utility in digital transmission systems generally is evident. For the measurement of the amplitude of direct-current pulses tuned amplifier 17, squarer 20, and integrator 21, all shown in Fig. 1, may be omitted.

What is claimed is:

A peak-reading electronic voltmeter circuit for measuring the peak amplitude of a recurring alternating-current tone burst signal burst-by-burst comprising a source of said tone burst signals, a tuned amplifier for passing said tone bursts and rejecting all other frequencies, a capacitor in the input circuit of said voltmeter to be charged to the peak amplitude of said tone bursts and a direct-current meter to indicate the state of the charge on said capacitor and hence the peak amplitude of said tone burst, a first conductive path directly connecting the output of said amplifier to charge said capacitor, said first path including a first rectifier poled for easy conduction toward said capacitor, and a second conductive path connecting the output of said amplifier to said capacitor for discharging said capacitor to a reference voltage level at the onset of each tone burst to be measured comprising a circuit for squaring the individual tone cycles of said burst signals, an integrator for converting the output of said squarer into a single pulse corresponding to each of said bursts, a differentiator for producing a sharp voltage spike corresponding to the leading edge of the output pulse from said integrator, an inverter for reversing the phase of the output spike from said differentiator, a second rectifier connecting the output of said inverter to said capacitor and poled for easy conduction away from said capacitor, and direct voltage means for biasing said last-mentioned rectifier into nonconduction in the absence of an output from said inverter and for determining said reference level.

References Cited in the file of this patent

UNITED STATES PATENTS

| | | |
|---|---|---|
| 2,519,295 | Shepard | Aug. 15, 1950 |
| 2,719,225 | Morris | Sept. 27, 1955 |

FOREIGN PATENTS

| | | |
|---|---|---|
| 697,879 | Great Britain | Sept. 20, 1953 |